Nov. 26, 1946.                LE ROY J. LINDBERG                2,411,549
ELECTRIC HEATING DEVICE FOR SOLDERING IRONS
Filed March 3, 1945
FIG. 1.
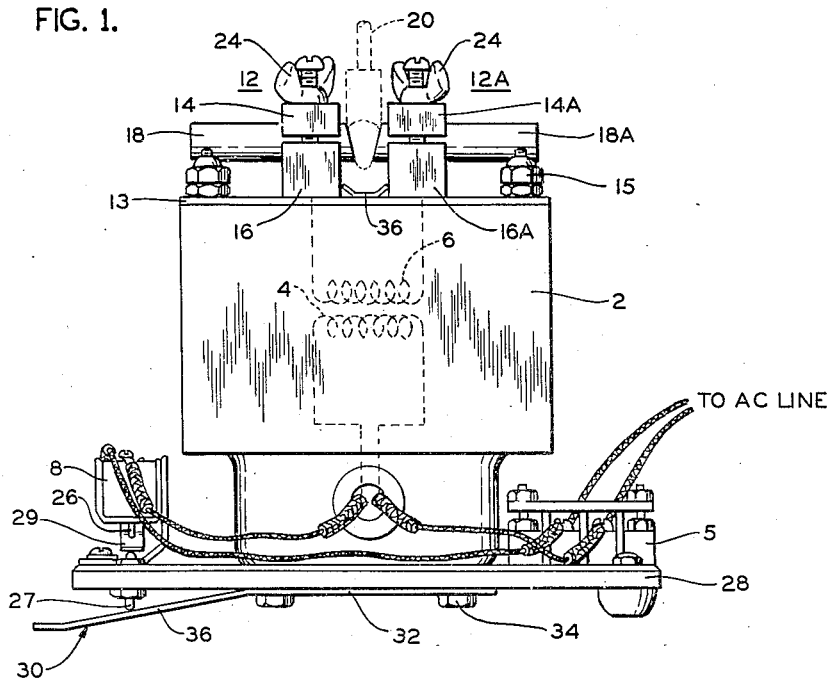
FIG. 2.
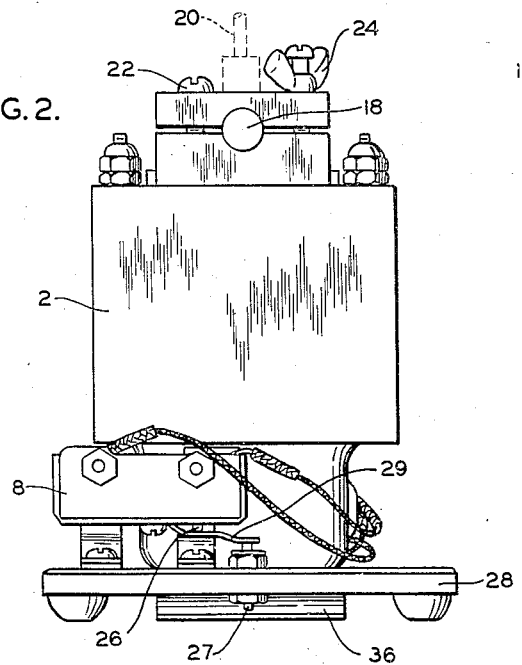
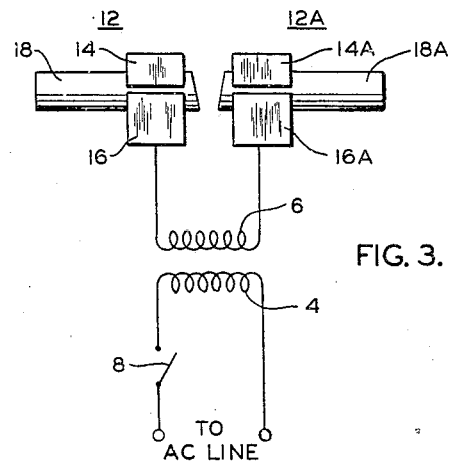
FIG. 3.
*INVENTOR.*
LEROY JOHN LINDBERG
BY
William D. Hall.
ATTORNEY Patented Nov. 26, 1946

2,411,549

UNITED STATES PATENT OFFICE 2,411,549

ELECTRIC HEATING DEVICE FOR SOLDERING IRONS

Le Roy John Lindberg, Wanamassa, N. J.

Application March 3, 1945, Serial No. 580,788

2 Claims. (Cl. 219—23)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to heating devices and has particular reference to devices for heating soldering irons.

Heretofore, soldering irons have been heated to operative temperature either by inserting the iron into a flame or by providing the iron with an internally located electrical heating unit. The use of a flame has proven unsatisfactory, both due to the difficulty of accurately determining the temperature of the iron in the flame and due to the fire hazard of a hot open flame. The use of an internally located electrical heating unit is also unsatisfactory, due to the fact that the necessary trailing wires frequently interfere with ease of operation and due to the fact that it is impossible to position such a unit in a very fine iron, such as is used in precision instrument work.

It is, therefore, an object of this invention to provide a device, external of a soldering iron, that will quickly bring a small soldering iron to an operative temperature.

It is also an object to provide such a device that will be inexpensive and simple to make and use.

In accordance with the foregoing objects, I have provided a device comprising a transformer having a normally-open switch in its primary circuit, and having a pair of spaced electrodes in its secondary circuit that are complementary to the tip portion of a soldering iron, whereby the said soldering iron may be introduced into and form a part of the secondary circuit, and responsive means whereby the said switch will close while the said soldering iron is in the said secondary circuit.

For a better understanding of the invention, reference is made to the following specification, read in connection with the attached drawing, in which:

Figure 1 is a front elevational view of a preferred embodiment of the invention, showing in phantom a soldering iron positioned between a pair of spaced complementary electrodes and, also in phantom, a diagrammatic representation of the primary and secondary windings of the transformer.

Figure 2 is a left side elevational view of the device shown in Figure 1, showing the normally-open switch in its closed position and a soldering iron in phantom, and Figure 3 is an electrical circuit diagram of the device shown in Figures 1 and 2.

Referring to Figure 1 of the drawing, the primary circuit of the step-down transformer 2 comprises a primary winding 4, one leg of which winding is connected to one side of an alternating current line at a terminal block 5 and the other leg of which is connected to the other side of the alternating current line at the said terminal block through a normally-open switch 8. The secondary circuit of the said transformer 2 comprises a secondary winding 6, the said secondary winding being terminated in a pair of spaced electrodes 12 and 12a. The said electrodes 12 and 12a are mounted on a plate 13 of insulating material that is secured to the top of the transformer 2 by bolts 15, and they form a complementary seat for a tip portion of a soldering iron 20.

The electrode 12, identical to its companion electrode 12a, comprises electrically conductive clamps 14 and 16, the adjacent faces thereof being oppositely grooved to provide a horizontal channel within which is positioned a carbon rod 18, which rod comprises the soldering iron engaging part of said electrode. The carbon rod 18 is beveled on its interior end and, in conjunction with the beveled end of its companion carbon rod 18a, forms a downwardly converging seat complementary to the tip portion of the said soldering iron 20, whereby the said soldering iron may be introduced into and form a part of the said secondary circuit. The carbon rods 18 and 18a may be copper plated to insure good electrical contact with the said tip portion of the soldering iron 20 and with the clamps 14, 16 and 14a, 16a. The carbon rods 18 and 18a may be moved laterally to assume a plurality of positions, whereby various soldering irons of differing sizes may be disposed therebetween to be heated. The said carbon rods 18 and 18a may be held firmly in position by any conventional means, a fixed bolt 22 and an adjustable nut 24 being the most convenient means in my preferred embodiment to enable the clamps 14, 16 and 14a, 16a to grip the said carbon rods.

The switch 8, the terminal block 5 and the transformer 2 are mounted on a baseboard 28. The spring 30 is securely fastened to the lower side of the baseboard 28. The spring 30 comprises a horizontal portion 32, whereby the spring is attached to the baseboard 28 by bolts 34, and an angular portion 36. A plunger 27 passes transversely through the baseboard 28 and is normally urged downwardly by a spring 29.

The normally-open switch 8 is of the microswitch type and is closed by an upward movement of a pin 26, which pin is urgeable upwardly by the spring 30 acting through the plunger 27 and the spring 29. The appearance of the device when the switch is closed is shown in Figure 2. When the upward force is removed from the pin 26, the said pin returns to its original position, reopening the primary circuit.

It is thus seen that the primary circuit is closed by a downward movement of the baseboard 28, which movement is translated through the spring 30, the plunger 27 and spring 29 to an upward movement of the pin 26. This movement is caused by pressing downward on the soldering iron 20 after it is inserted into its complementary seat formed by the beveled ends of the carbon rods 18 and 18a.

With the switch 8 thus closed and the primary circuit completed, a current will be induced in the secondary circuit and will pass through the soldering iron 20 seated between the carbon rods 18 and 18a. Since the soldering iron 20 constitutes a virtual short circuit of the secondary, a heavy current will flow and the iron will be heated to operative temperature in a very few seconds. When the soldering iron 20 is removed, the downward pressure on the device will be released, the pin 26 will move downward and open the primary circuit.

An insulated trough 36 is provided to catch any solder that may drop from the soldering iron 20 while the iron is being heated. This trough is positioned between the electrodes 18 and 18a, and lies on the plate 13 of the transformer 2.

I have thus disclosed a device whereby a soldering iron may be quickly and easily heated by a convenient means external of the soldering iron.

While I have shown a preferred embodiment of the invention, it is obvious that many modifications and changes are possible. My invention, therefore, must not be limited to this particular embodiment, but rather shall be defined by the appended claims.

I claim:

1. The combination, with a transformer mounted on an apertured baseboard and having in its secondary circuit a pair of electrodes complementary to the tip portion of a soldering iron, of a normally-open swtch forming a part of the primary circuit of said transformer and mounted on said baseboard about the apertured area thereof, a leaf spring fixed to the lower side of said baseboard and having a downwardly converging portion disposed under said apertured area, and a plunger slidably positioned through said apertured area, whereby insertion of soldering iron into the aforesaid electrodes will cause relative movement of said baseboard and spring, thereby moving said plunger upwardly against said normally-open switch, whereby said switch will be closed and the primary circuit of the aforesaid transformer will be completed.

2. A device for heating a soldering iron comprising a transformer having a primary and a secondary winding mounted on an apertured baseboard, a pair of electrodes terminating said secondary winding and secured to the top of said transformer and insulated therefrom and from each other by a plate of insulating material, the said electrodes including a pair of adjustable, aligned conductive rods having their adjacent ends beveled to form a downwardly converging seat complementary to the tip of said soldering iron, whereby said soldering iron may be introduced into and form a part of said secondary circuit, a normally-open switch in the primary winding and secured to the top of said baseboard about the apertured area of said baseboard, a spring member secured to the lower side of said baseboard and having a downwardly converging portion under said apertured area of said baseboard, whereby a downward movement of said transformer when said soldering iron is introduced between said electrodes will cause a relative movement of said spring toward said baseboard, and plunger means slidably positioned through said apertured area, whereby relative movement of said spring toward said baseboard will cause the said plunger to move upward and close said normally-open switch, thereby closing the primary circuit of said transformer.

LE ROY JOHN LINDBERG.